Dec. 22, 1942. V. ASARO 2,306,150
SPRING STRUCTURE
Filed June 23, 1941
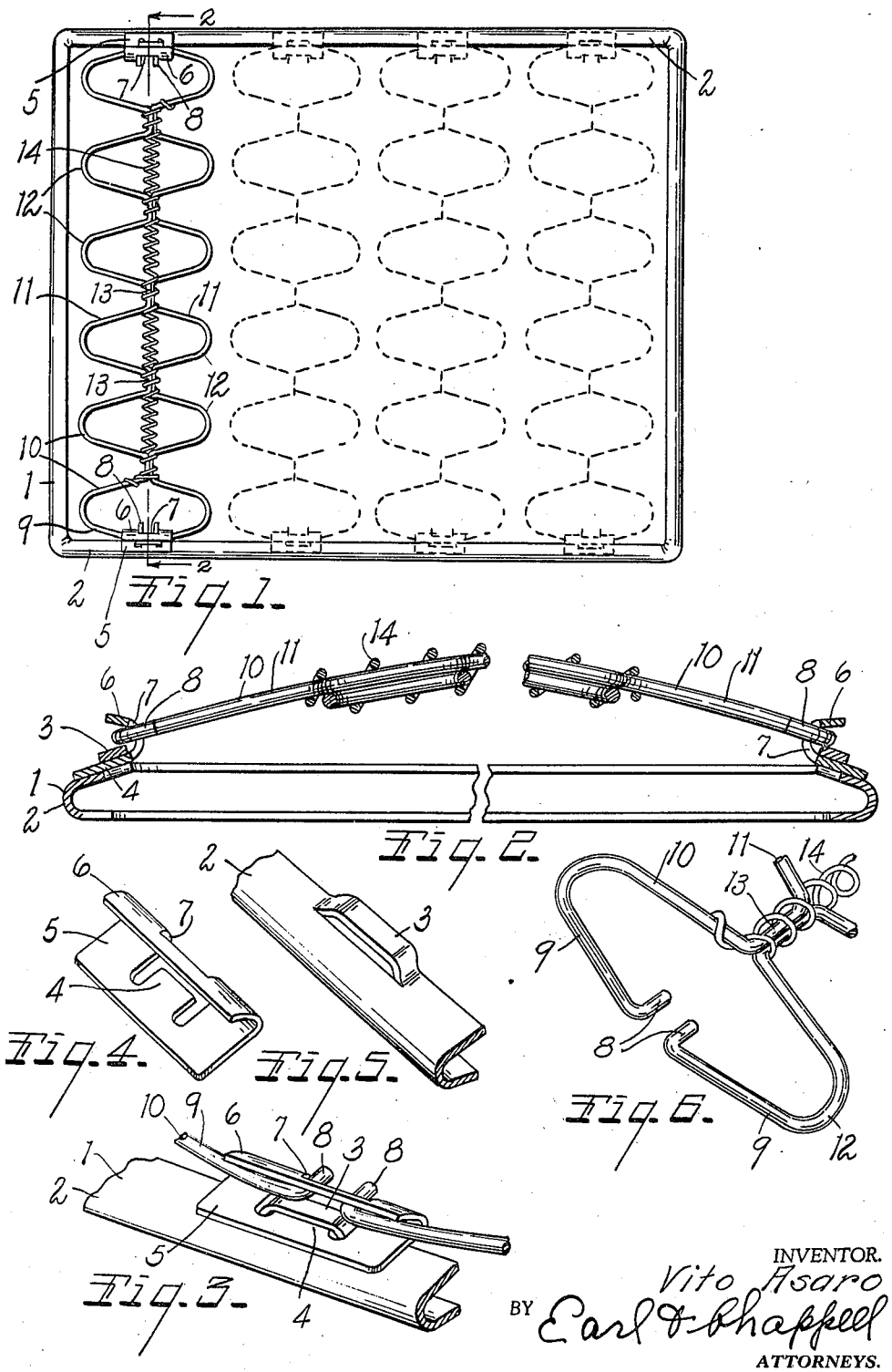
INVENTOR.
Vito Asaro
BY Earl V. Chappell
ATTORNEYS.

Patented Dec. 22, 1942

2,306,150

UNITED STATES PATENT OFFICE 2,306,150

SPRING STRUCTURE

Vito Asaro, Detroit, Mich., assignor to L. A. Young Spring & Wire Corporation, Detroit, Mich.

Application June 23, 1941, Serial No. 399,304

7 Claims. (Cl. 155—179)

This invention relates to improvements in spring structures.

The main object of this invention is to provide an improved spring structure employing bowed spring elements in which the elements are very quickly and securely assembled with the frame.

A further object is to provide a spring structure of this type which is economical in its parts and in the assembly thereof.

Objects pertaining to details and economies of the invention will definitely appear from the description to follow. The invention is defined in the claims.

A structure embodying the features of this invention is clearly illustrated in the accompanying drawing, wherein:

Fig. 1 is a plan view of a spring assembly embodying the features of my invention, parts of the spring units or members being indicated by dotted lines.

Fig. 2 is an enlarged fragmentary sectional view on line 2—2 of Fig. 1.

Fig. 3 is an enlarged fragmentary perspective view showing details of the frame structure and the spring unit mounting saddles or members.

Fig. 4 is a perspective view of one of the spring mounting saddles or members.

Fig. 5 is a fragmentary perspective view of a section of the frame showing structural features thereof.

Fig. 6 is an enlarged fragmentary perspective view of an end of one of the spring units.

In the accompanying drawing I have illustrated my present invention as embodying spring units of the type illustrated in the joint application of William A. Clark and Vito Asaro, Serial No. 347,619, filed July 26, 1940.

In the present invention I provide a border frame designated generally by the numeral 1, this being of inwardly facing channel section. The opposed side members 2 have loops or offset bights 3 struck up therefrom in longitudinally spaced relation defining laterally exposed openings, see Fig. 1. These loops are adapted to receive the inwardly directed tongues 4 of the saddle members 5 which are formed of sheet metal stampings and have outturned flanges 6 at their inner ends longitudinally slotted at 7 to receive the inwardly directed lugs 8 with which the arms 9 of the spring units 10 terminate.

These spring units 10 are bowed and each comprises a pair of wire strands 11 having longitudinally spaced loops 12 of substantial length. One object of spacing these loops is to provide reaches 13 between the loops. These reaches are arranged in side by side relation with the loops oppositely disposed. These strand or unit members are permanently secured to each other by means of helical tie members 14 which are threaded or spiraled about the reaches 13 so as to tie the unit members together and to bridge the spaces between the arms of the loops. It will be noted that coils of the loops engage the arms of the members and the ends 15 are attached to one of the end loops, thus preventing these tie members from working loose at either end.

As stated, the end arms 9 of each strand terminate in the inturned lugs 8. These lugs are engaged with the slot 7 with the arms 9 lying on the outside of the flange 6. The spring units are initially given a bowed set on an arc or curve, the radius of which is substantially less than the radius of the arc in which the spring lies when it is attached to the frame or support so that the stress or tension of the bowed spring member holds the arms 9 and their lugs in engagement with the saddle members and holds the saddle members in engagement with the frame members. This condition is not materially changed by compression of a portion of the spring unit in use as when one portion thereof is forced downwardly it is found to tend to bow another portion outwardly, thus maintaining engagement of the spring units with their supporting saddle members.

The invention has a wide application, being adapted for embodiment in various types of cushion spring structures such as furniture and automobile seat and back cushions. I have not illustrated and described the various embodiments which are possible as it is believed this disclosure will enable those skilled in the art to embody the invention as may be desired. It will be understood that no attempt has been made to illustrate the parts in proper proportions.

Having thus described the invention what is claimed as new and desired to secure by Letters Patent is:

1. In a spring structure, the combination with a border frame comprising opposed members having offset bights struck up therefrom, a plurality of bowed spring units disposed in spaced parallel relation relative to each other, each unit comprising two strands of spring wire having longitudinally spaced loops of substantial length disposed with the loops of the strands in oppositely disposed relation and with the reaches between the loops in side by side relation, the arms of the end loops terminating in inwardly directed lugs, a continuous helical tie member coiled about the reaches of the strands between the loops and bridging the spaces between the arms of the loops, and saddle members having inwardly directed tongues engaging said offset bights, said saddle members having slotted flanges, said lugs being engaged with said slots.

2. In a spring structure, the combination with a border frame comprising opposed members of inwardly facing channel section, the upper arms of which have offset bights struck up therefrom, a plurality of bowed spring units disposed in spaced parallel relation relative to each other, each unit comprising two strands of spring wire having longitudinally spaced loops of substantial length disposed with the loops of the strands in oppositely disposed relation, the reaches between the loops being connected, the arms of the end loops terminating in inwardly directed lugs, and saddle members having inwardly directed tongues engaging said offset bights, said saddle members having outwardly curved slotted flanges receiving said outer arms with the lugs engaged with said slots.

3. In a spring structure, the combination with a border frame comprising opposed members having offset bights struck up therefrom, a plurality of bowed spring units disposed in spaced parallel relation relative to each other, each unit comprising two strands of spring wire having longitudinally spaced loops of substantial length disposed with the loops of the strands in oppositely disposed relation, the reaches between the loops being connected, the arms of the end loops terminating in inwardly directed lugs, and saddle members having inwardly directed tongues engaging said offset bights, said saddle members having outwardly curved slotted flanges receiving said outer arms with the lugs engaged with said slots.

4. In a spring structure, the combination with opposed frame members provided with openings therein, a plurality of bowed spring units disposed in spaced parallel relation relative to each other, each unit comprising two strands of spring wire having longitudinally spaced loops of substantial length disposed with the loops of the strands in oppositely disposed relation, the reaches between the loops being connected, the arms of the end loops terminating in inwardly directed lugs, and saddle members having tongues engaging said frame member openings, and having slotted flanges, said arms being engaged with said flanges with said arms disposed on the outer sides of said flanges.

5. In a spring structure, the combination with opposed frame members provided with loops, a plurality of bowed spring members terminating at the ends thereof in inwardly directed lugs, and saddle members having inwardly directed tongues engaging said loops and having flanges at their inner ends provided with lug receiving openings, the ends of said spring members being disposed on the outer side of said flanges with their lugs engaged in said openings.

6. In a spring structure, the combination with opposed frame members provided with loops, a plurality of bowed spring members having inwardly directed end anchoring elements, and saddle members having inwardly directed tongues engaging said loops and provided with means for receiving said anchoring elements, said elements being engaged with said last named means.

7. In a spring structure, the combination with opposed frame members provided with openings therein, a plurality of bowed spring members terminating at the ends thereof in inwardly directed lugs, and saddle members non-swingably engageable with said frame members provided with inwardly directed elements receivable in said frame member openings, said saddle members having flanges provided with lug receiving openings, the ends of said spring members being disposed on the outer sides of said flanges with their lugs engaged with their said openings.

VITO ASARO.